(12) United States Patent
Tsunekawa

(10) Patent No.: US 10,015,358 B2
(45) Date of Patent: Jul. 3, 2018

(54) IMAGE FORMING SYSTEM FOR DETERMINING IF COLOR INFORMATION OF PRINT DATA CAN BE CHANGED PRIOR TO PRINTING

(71) Applicant: CANON KABUSHIKI KAISHA, Tokyo (JP)

(72) Inventor: Kiyohiro Tsunekawa, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/053,518

(22) Filed: Feb. 25, 2016

(65) Prior Publication Data

US 2016/0261766 A1 Sep. 8, 2016

(30) Foreign Application Priority Data

Mar. 3, 2015 (JP) .................................. 2015-041462

(51) Int. Cl.
*H04N 1/23* (2006.01)
*H04N 1/32* (2006.01)
(Continued)

(52) U.S. Cl.
CPC ............. *H04N 1/333* (2013.01); *H04N 1/233* (2013.01); *H04N 1/2392* (2013.01);
(Continued)

(58) Field of Classification Search
CPC .. H04N 1/333; H04N 1/2392; H04N 1/32106; H04N 1/46
(Continued)

(56) References Cited

U.S. PATENT DOCUMENTS 7,633,659 B2 12/2009 Uotani et al.
8,411,294 B2 * 4/2013 Inoue .................... G06F 3/1208
358/1.13
(Continued)

FOREIGN PATENT DOCUMENTS

JP 2006011847 A 1/2006
JP 2013-120401 * 6/2013

OTHER PUBLICATIONS

English language machine translation of JP 2013-120401 to Tsunekawa.*

*Primary Examiner* — Eric A Rust
(74) *Attorney, Agent, or Firm* — Rossi, Kimms & McDowell LLP

(57) ABSTRACT

An image forming apparatus capable of preventing print setting information of print data transmitted from an external apparatus from being changed into infeasible information. A CPU of the apparatus stores print data transmitted from the external apparatus. The print data includes a content to be printed and print setting information indicating whether the content is to be printed in color or in monochrome. The CPU determines whether or not the content is chromatic. The CPU receives an instruction for changing the print setting information from a user, before starting to print the print data. In a case where the print setting information indicates that the content is to be printed in monochrome, the CPU permits changing the color mode information as for a content determined to be chromatic and restricts changing the color mode information as for a content determined to be not chromatic.

24 Claims, 11 Drawing Sheets

(51) Int. Cl.
 *H04N 1/46* (2006.01)
 *H04N 1/333* (2006.01)
(52) U.S. Cl.
 CPC .......... *H04N 1/32106* (2013.01); *H04N 1/46* (2013.01); *H04N 2201/0094* (2013.01)
(58) Field of Classification Search
 USPC .............................................. 358/1.15, 1.14
 See application file for complete search history.

(56) References Cited

U.S. PATENT DOCUMENTS

| | | | |
|---|---|---|---|
| 2010/0328720 A1* | 12/2010 | Suzuki .................. | G06F 3/1204 358/1.15 |
| 2012/0194857 A1* | 8/2012 | Yamada .................. | G06F 3/121 358/1.15 |
| 2013/0141743 A1* | 6/2013 | Miyazawa ......... | H04N 1/00095 358/1.13 |
| 2013/0155429 A1* | 6/2013 | Nakata .................... | H04N 1/04 358/1.9 |

\* cited by examiner

IMAGE FORMING SYSTEM FOR DETERMINING IF COLOR INFORMATION OF PRINT DATA CAN BE CHANGED PRIOR TO PRINTING

BACKGROUND OF THE INVENTION

Field of the Invention

The present invention relates to an image forming apparatus, a method of controlling the same, and a storage medium, and more particularly to an image forming apparatus that performs a printing process based on print data transmitted from the outside, a method of controlling the same, and a storage medium.

Description of the Related Art

There has been known a printing system in which print data for use in performing a printing process, which is transmitted from a client PC as an external apparatus, is stored in a print server as an external apparatus, and an MFP (Multi-Function Printer) as an image forming apparatus acquires the print data from the print server to perform the printing process based on the acquired print data. In this printing system, normally, an authentication printing process is performed in order to prevent a user from forgetting to take a printing result output by the printing process. In the authentication printing process, when the user holds an IC card including user information for identifying the user, over the MFP, user authentication is performed, and at least one print data item associated with the user is transmitted from the print server to the MFP. The print data includes a document file for use in the printing process, and PDL (Page Description Language) data formed by converting the document file to a PDL format readable by the MFP. Further, the print data includes print setting information including the number of printing sheets, a sheet type, and color printing or monochrome printing. When the MFP performs the printing process based on the print data transmitted from the print server, the MFP displays a preview screen including the print setting information of the print data on a display section provided in the MFP (see e.g. Japanese Patent Laid-Open Publication No. 2006-11847). This makes it possible for the user to check the print setting information before performing the printing process based on the print data transmitted from the client PC. In recent years, there has been developed a technique for enabling the user, upon checking the preview screen to recognize any erroneous setting of print setting information, to change the print setting information by operating an operation section provided in the MFP, instead of transmitting print data including changed print setting information anew from the client PC.

However, there is a case where even when print setting information is changed by operating the operation section provided in the MFP, the change in the print setting information is not reflected on the printing process. For example, when print setting information is changed from the setting of monochrome printing to the setting of color printing, in a printing process directly using a document file (direct printing process), the document file can be used for color printing as well, so that when the user has changed print setting information using the MFP, the change in the print setting information is reflected on the printing process, and color printing is performed. However, in a printing process in which PDL data included in print data, which has been transformed into gray scale due to designation of monochrome printing, is used, the PDL data cannot be used for color printing, and hence even when the user has changed the print setting information using the MFP, color printing is not performed. In short, in the conventional image forming apparatus, there is a possibility that print setting information of print data transmitted from an external apparatus is changed to infeasible print setting information.

SUMMARY OF THE INVENTION

The invention provides an image forming apparatus that is capable of preventing print setting information of print data transmitted from an external apparatus from being changed to infeasible print setting information, a method of controlling the same, and a storage medium.

In a first aspect of the present invention, there is provided an image forming apparatus comprising a storage unit configured to store print data transmitted from an external apparatus, the print data including a content to be printed and color mode information indicating whether the content is to be printed in color or in monochrome, a determination unit configured to determine whether or not the content included in the print data is a chromatic content, a reception unit configured to receive an instruction for changing the color mode information from a user, before starting to print the print data stored by the storage unit, and a control unit configured to, in a case where the color mode information indicates that the content is to be printed in monochrome, permit changing the color mode information in a case where the determination unit determines that the content is a chromatic content, and restrict changing the color mode information in a case where the determination unit determines that the content is not a chromatic content.

In a second aspect of the present invention, there is provided a method of controlling an image forming apparatus, comprising storing print data transmitted from an external apparatus, the print data including a content to be printed and color mode information indicating whether the content is to be printed in color or in monochrome, determining whether or not the content included in the print data is a chromatic content, receiving an instruction for changing the color mode information from a user, before starting to print the print data stored by said storing, and in a case where the color mode information indicates that the content is to be printed in monochrome, permitting changing the color mode information in a case where said determining determines that the content is a chromatic content, and restricting changing the color mode information in a case where said determining determines that the content is not a chromatic content.

In a third aspect of the present invention, there is provided a non-transitory computer-readable storage medium storing a computer-executable program for executing a method of controlling an image forming apparatus, wherein the method comprises storing print data transmitted from an external apparatus, the print data including a content to be printed and color mode information indicating whether the content is to be printed in color or in monochrome, determining whether or not the content included in the print data is a chromatic content, receiving an instruction for changing the color mode information from a user, before starting to print the print data stored by said storing, and in a case where the color mode information indicates that the content is to be printed in monochrome, permitting changing the color mode information in a case where said determining determines that the content is a chromatic content, and restricting changing the color mode information in a case where said determining determines that the content is not a chromatic content.

According to the invention, it is possible to prevent print setting information of print data transmitted from an external apparatus from being changed to infeasible print setting information.

Further features of the present invention will become apparent from the following description of exemplary embodiments (with reference to the attached drawings).

BRIEF DESCRIPTION OF THE DRAWINGS

FIG. 6A is a view of a print data list screen as an example of various setting screens displayed on a display section of the MFP.

FIG. 6B is a view of a print setting change screen as an example of the various setting screens displayed on the display section of the MFP.

DESCRIPTION OF THE EMBODIMENTS

The present invention will now be described in detail below with reference to the accompanying drawings showing embodiments thereof.

Although in the present embodiment, the invention is applied to an MFP as an image forming apparatus, the invention is not limitedly applied to the MFP, but the invention can be applied to any other image forming apparatus, insofar as it is an image forming apparatus, including an LFP (Large Format Printer) or an SFP (Single Function Printer), which is capable of acquiring print data from an external apparatus.

Figure 1:
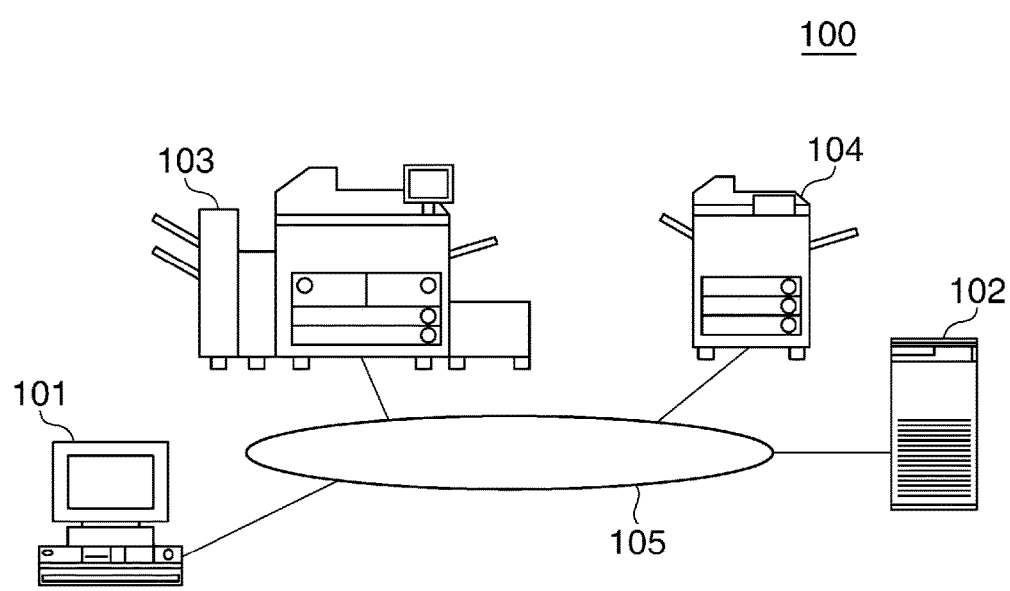
FIG. 1 is a schematic network diagram of an image processing system including an MFP as an image forming apparatus according to a first embodiment of the invention.

FIG. 1 is a schematic network diagram of an image processing system 100 including the MFP 103 as the image forming apparatus according to a first embodiment of the invention.

Referring to FIG. 1, the image processing system 100 is comprised of a client PC 101 as an external apparatus, an authentication print server 102 as an external apparatus, the MFP 103, and an MFP 104, which are connected to each other via a network 105.

The client PC 101 generates print data including an instruction for executing a printing process, and transmits the generated print data to the authentication print server 102, the MFP 103 or 104. The print data includes user information for identifying a user who has instructed execution of the printing process, and various print setting information for setting conditions for executing the printing process. Further, the print data includes a document file for use in the printing process, and PDL data obtained by converting the document file to a format readable by each of the MFPs 103 and 104. The document file A is written in a page description language, such as TIFF, JPEG, PDF, or XPS. The authentication print server 102 stores print data transmitted from the client PC 101, acquires user information read by the MFP 103 or 104 to perform user authentication, and transmits print data associated with the acquired user information to the MFP 103 or 104. The MFPs 103 and 104 each perform the printing process based on print data transmitted from either of the client PC 101 and the authentication print server 102. Further, each of the MFPs 103 and 104 is capable of reserving print data instead of immediately performing a printing process based on the print data. For example, the MFP 103 is capable of acquiring the print data from the MFP 104 reserving the same, and performing the printing process based on the acquired print data. That is, in the present embodiment, the MFP 103 can acquire print data from any of the client PC 101, the authentication print server 102, and the MFP 104, which are connected to the network 105. Further, the MFPs 103 and 104 each perform e.g. a PDL printing process in which printing is performed using print data including PDL data, and a direct printing process. Here, in the present embodiment, the "printing process" is defined as including the PDL printing process and the direct printing process.

Next, a description will be given of the configurations of the authentication print server 102 and the MFPs 103 and 104. Note that in the present embodiment, since the MFPs 103 and 104 have the same configuration, the description is given of the MFP 103, by way of example.

Figure 2:
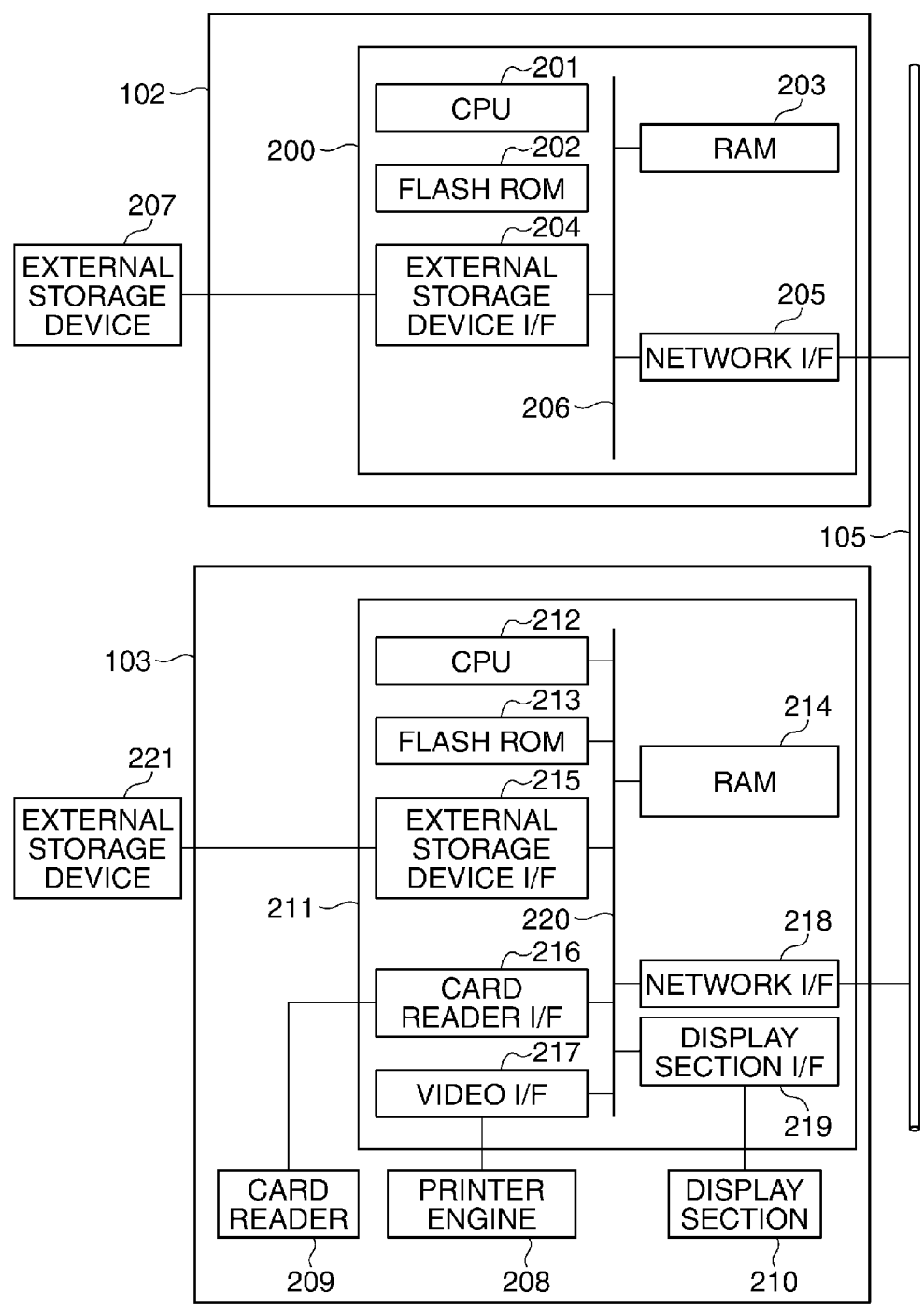
FIG. 2 is a schematic block diagram of an authentication print server and the MFP appearing in FIG. 1.

FIG. 2 is a schematic block diagram of the authentication print server 102 and the MFP 103 appearing in FIG. 1.

Referring to FIG. 2, the authentication print server 102 includes a controller 200. The controller 200 includes components, such as a CPU 201, a flash ROM 202, a RAM 203, an external storage device interface 204, and a network interface 205. These components are connected to each other via a system bus 206. The MFP 103 includes a printer engine 208, a card reader 209, a display section 210, and a controller 211. The controller 211 is connected to each of the printer engine 208, the card reader 209, and the display section 210. The controller 211 includes components, such as a CPU 212, a flash ROM 213, a RAM 214, an external storage device interface 215, a card reader interface 216, a video interface 217, a network interface 218, and a display section interface 219. These components are connected to each other via a system bus 220.

The controller 200 of the authentication print server 102 controls data communication of the authentication print server 102. The CPU 201 executes various control programs stored in the flash ROM 202, and controls the components connected to the system bus 206. The RAM 203 is a volatile memory, and is used as a work area for the CPU 201 and a temporary storage area for storing various data used in various processing performed by the CPU 201. The external storage device interface 204 performs data communication with an external storage device 207 capable of storing various data. The network interface 205 performs data communication with various apparatuses connected thereto via the network 105.

The printer engine 208 of the MFP 103 performs printing on sheets based on print data transmitted from the authentication print server 102. The card reader 209 acquires various information from a contactless IC card. For example, when the user holds an IC card including user information of the user over the card reader 209, the card reader 209 acquires the user information included in the IC card. The acquired user information is transmitted to the authentication print server 102 via the network 105. The display section 210 displays screens for configuring various settings of the MFP 103. In the present embodiment, the display section 210 displays e.g. a print data list screen 600, described hereinafter with reference to FIG. 6A, which is used for selecting print data, and a print setting change screen 603, described hereinafter with reference to FIG. 6B, which is used for changing various print setting information used in the printing process.

The controller 211 of the MFP 103 performs centralized control of the MFP 103. The CPU 212 executes various control programs stored in the flash ROM 213, and a software module 300, described hereinafter with reference to FIG. 3, loaded into the RAM 214, to thereby control the components connected to the system bus 220. The RAM 214 is a volatile memory, and is used as a work area for the CPU 212 and a temporary storage area for storing various data used in various processing performed by the CPU 212. The external storage device interface 215 performs data communication with an external storage device 221 capable of storing various data. For example, the external storage device interface 215 stores print data transmitted from the authentication print server 102 in the external storage device 221. The network interface 218 performs data communication with the apparatuses connected thereto via the network 105. In the present embodiment, the network interface 218 receives print data transmitted from the authentication print server 102.

Figure 3:
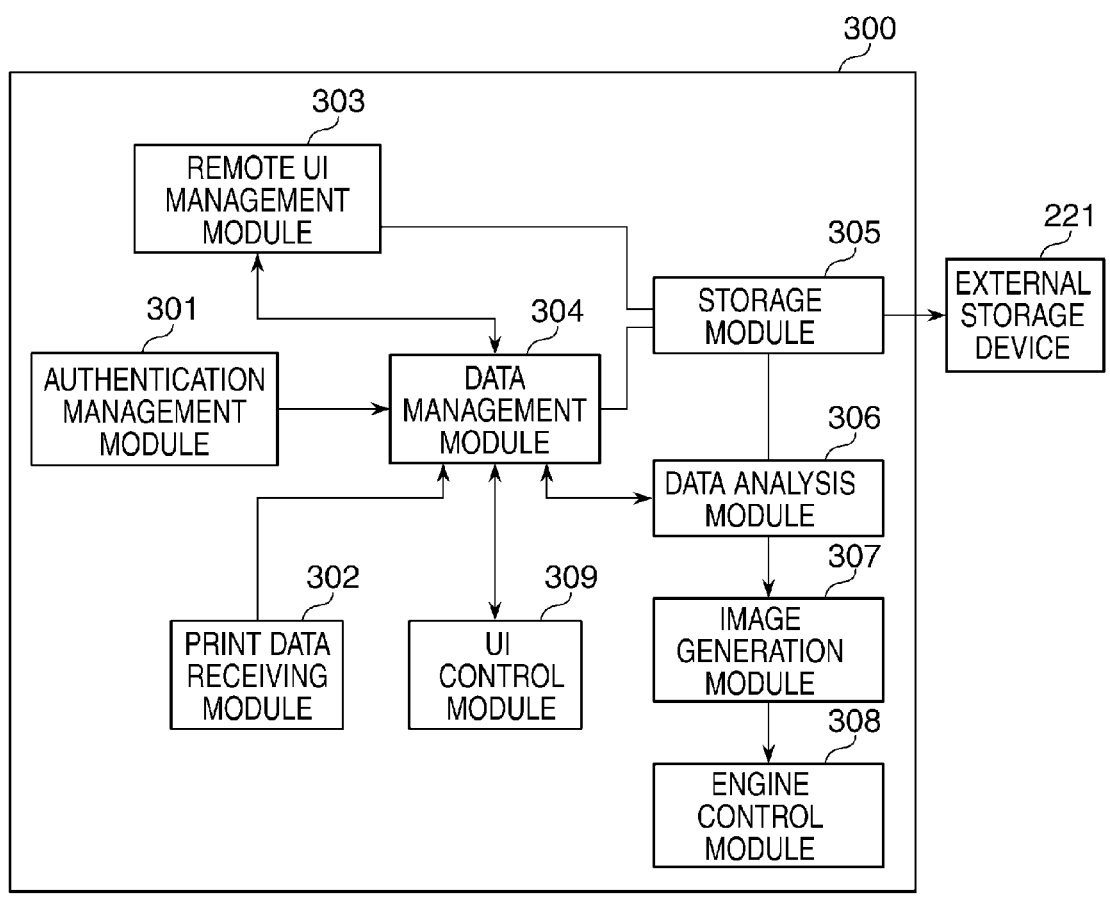
FIG. 3 is a schematic block diagram of a software module of the MFP.

FIG. 3 is a schematic block diagram of the software module 300 of the MFP 103.

Referring to FIG. 3, the software module 300 includes an authentication management module 301, a print data receiving module 302, a remote user interface management module 303, a data management module 304, a storage module 305, a data analysis module 306, an image generation module 307, an engine control module 308, and a user interface control module 309. When the software module 300 is loaded into the RAM 214 for the CPU 212 to execute the loaded software module 300, processing associated with each of the above-mentioned modules is performed.

When user information is acquired by the card reader 209, the authentication management module 301 transmits the acquired user information and a user authentication request notification to the authentication print server 102. The print data receiving module 302 controls a process for receiving print data transmitted from the apparatuses connected to the network 105.

Figure 4A:
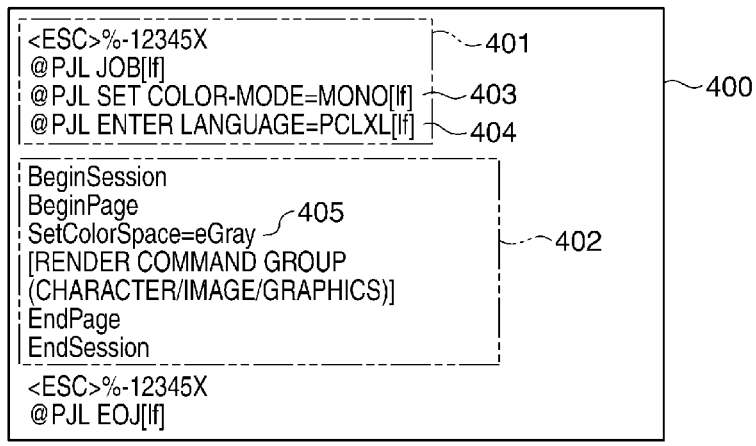
FIG. 4A is a view of print data using PCLXL as a page description language used in the MFP.
Figure 4B:
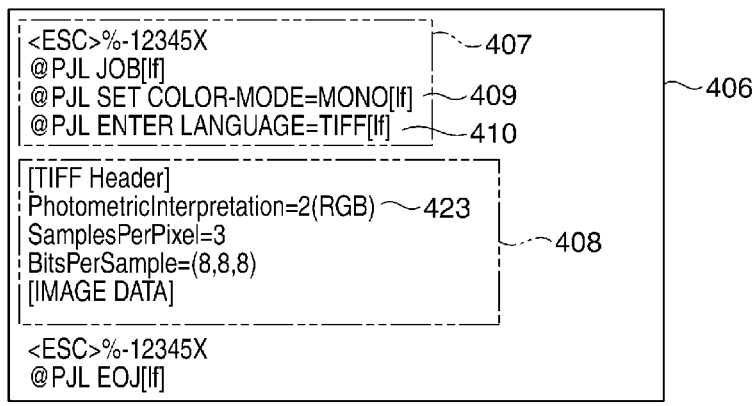
FIG. 4B is a view of print data using TIFF as a page description language used in the MFP.

Here, a description will be given of the print data with reference to FIGS. 4A and 4B. As shown in FIGS. 4A and 4B, print data items 400 and 406, as examples of the print data, include header sections 401 and 407, and data sections 402 and 408, respectively. The respective header sections 401 and 407 include color modes 403 and 409 for setting e.g. color printing (chromatic color printing) or monochrome printing, and description language setting information items 404 and 410 indicative of description languages of the print data (page description languages). For example, as shown in FIG. 4A, the color mode 403 is set to a setting of "MONO" for setting the monochrome printing (hereinafter referred to as the "monochrome printing setting"), and the description language setting information 404 is set to a setting of "PCLXL" indicative of a description language associated with PDL data. The data sections 402 and 408 include setting items of color data used in the printing process. For example, in FIG. 4A, a setting item 405 of color data is set to a setting of "eGray" for converting color data into gray scale data. Normally, the print data having the setting of "eGray" does not include data of colors (hereinafter referred to as "color data") other than white, black, and gray. That is, the print data having the setting of "eGray" cannot be used for color printing.

Figure 4C:
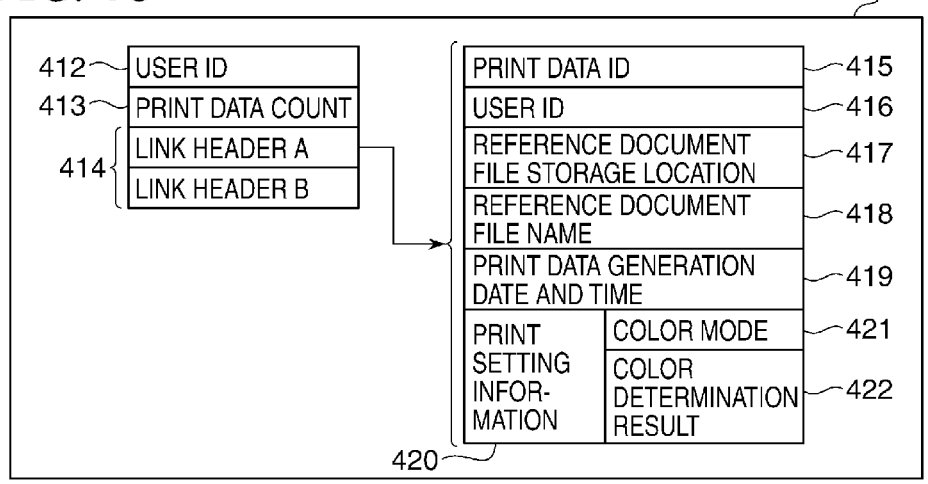
FIG. 4C is a view of bibliographic data used in the MFP.

The remote user interface management module 303 generates Web data for displaying various setting menus of the MFP 103, histories of executions of various processes, and the like, on other apparatuses. The data management module 304 generates bibliographic data 411, shown in FIG. 4C, for managing print data. The bibliographic data 411 includes a user ID 412, a print data count 413 indicating the number of print data items, and a link header group 414. The bibliographic data 411 is generated on a user-by-user basis. The user ID 412 includes a user ID for identifying a user who has instructed transmission of print data. The print data count 413 includes the number of print data items associated with the user ID. The link header group 414 includes a link header linking to detailed information of each print data item associated with the user ID. Link headers linking to detailed information of print data items stored in the external storage device 221 are added to the link header group 414 in the order of storage of the print data items in the external storage device 221.

The bibliographic data 411 includes a print data ID 415, a user ID 416, a reference document file storage location 417, a reference document file name 418, a print data generation date and time 419, and print setting information 420. The print data ID 415 includes a print data ID for identifying print data. The user ID 416 includes a user ID corresponding to the user ID 412. The reference document file storage location 417 includes information on the location of storage of a document file used when the print data is generated by the client PC 101. The reference document file name 418 includes a document file name for identifying the document file. The print data generation date and time 419 includes information on the date and time when the print data was generated by the client PC 101. The print setting information 420 includes a color mode 421, which corresponds to either of the color modes 403 and 409 included in the respective header sections 401 and 407, and a color determination result 422, which corresponds to a color determination result set in a bibliographic data generating process, described hereinafter with reference to FIG. 7.

Referring again to FIG. 3, the storage module 305 stores, for example, the print data items 400 and 406 and the bibliographic data 411 in the external storage device 221. The data analysis module 306 analyzes color data items included in the print data items 400 and 406. In the present embodiment, the color determination result 422 in the bibliographic data 411 is set to a result of the analysis. The image generation module 307 generates, based on each print data item, image data for the printing process. The engine control module 308 transmits the generated image data as video signals to the printer engine 208. The user interface control module 309 generates display data for causing various setting screens to be displayed on the display section 210. In the present embodiment, the user interface control module 309 generates display data for displaying the print data list screen 600, described hereinafter with reference to FIG. 6A, and the print setting change screen 603, described hereinafter with reference to FIG. 6B.

Figure 5:
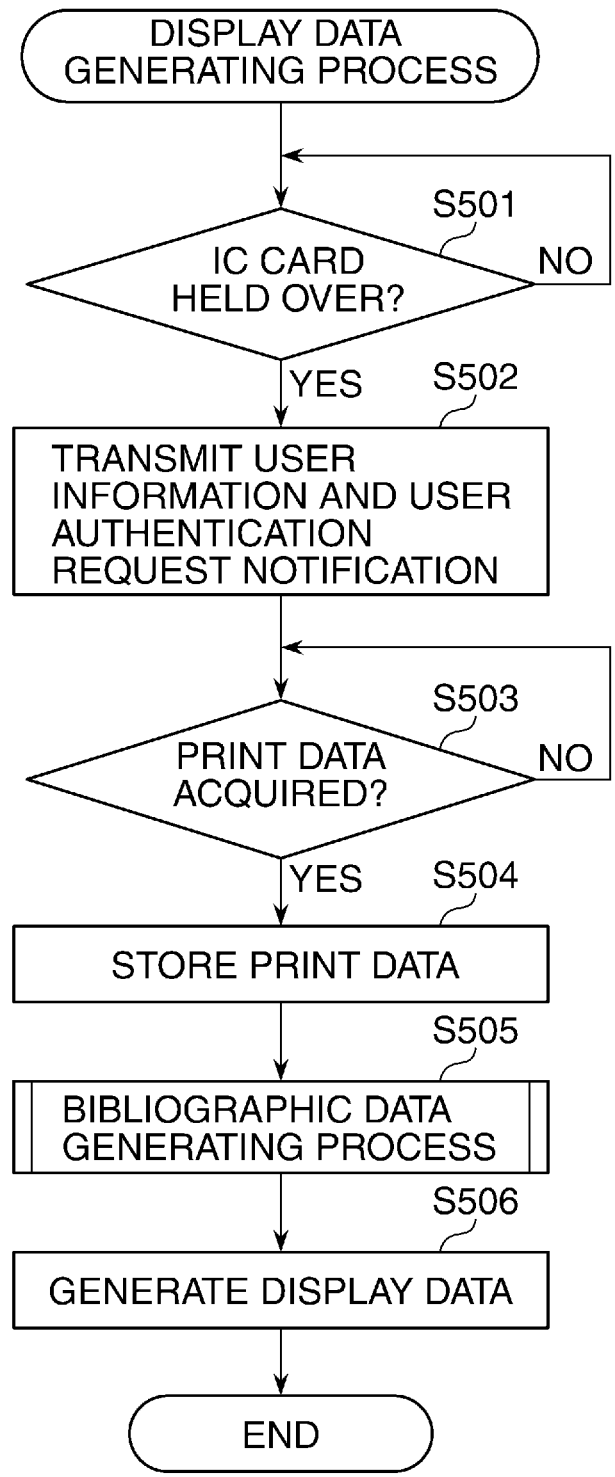
FIG. 5 is a flowchart of a display data generating process performed by the MFP.

FIG. 5 is a flowchart of a display data generating process performed by the MFP 103 appearing in FIG. 1.

The display data generating process in FIG. 5 is performed by the CPU 212 that executes the software module 300 loaded in the RAM 214. The display data generating process in FIG. 5 is performed when the MFP 103 displays, on the display section 210, print setting information included in print data acquired from any of the apparatuses connected to the network 105. Here, it is presupposed, by way of example, that print data is acquired from the authentication print server 102 among the apparatuses connected to the network 105.

Referring to FIG. 5, first, when the CPU 212 of the MFP 103 detects that an IC card is held over the card reader 209 (YES to a step S501), the CPU 212 acquires user information included in the IC card, and transmits the acquired user information and a user authentication request notification to the authentication print server 102 (step S502). Upon receipt of the user information and the user authentication request notification, the authentication print server 102 performs user authentication based on the user information, and when the user authentication is successful, transmits at least one print data item associated with the user information to the MFP 103. Then, upon acquisition of the print data transmitted from the authentication print server 102 (YES to a step S503), the CPU 212 of the MFP 103 stores the acquired print data in the external storage device 221 (step S504). Then, the CPU 212 performs the bibliographic data generating process, described hereinafter with reference to FIG. 7, to thereby generate bibliographic data 411 of the acquired print data (step S505). Next, the CPU 212 generates, based on the generated bibliographic data 411, display data for displaying the print data list screen 600, shown in FIG. 6A, and the print setting change screen 603, shown in FIG. 6B, on the display section 210 (step S506). In the present embodiment, when the user requests display of list information of the print data, the CPU 212 displays the print data list screen 600, shown in FIG. 6A, on the display section 210, based on the generated display data. The print data list screen 600 includes a print data information group 601 for identifying the acquired print data, and various setting buttons including a detailed information button 602. On the display section 210 displaying the print data list screen 600, when the user selects a desired print data item from print data items of the print data information group 601, and presses the detailed information button 602, the print setting change screen 603, shown in FIG. 6B, for use in changing print setting information of the selected print data item is displayed. The print setting change screen 603 includes various print setting information items which are associated with the bibliographic data 411 and include a color mode 604 for making a setting of color printing or monochrome printing. The CPU 212 thus executes the step S506, and then terminates the present process.

Figure 7:
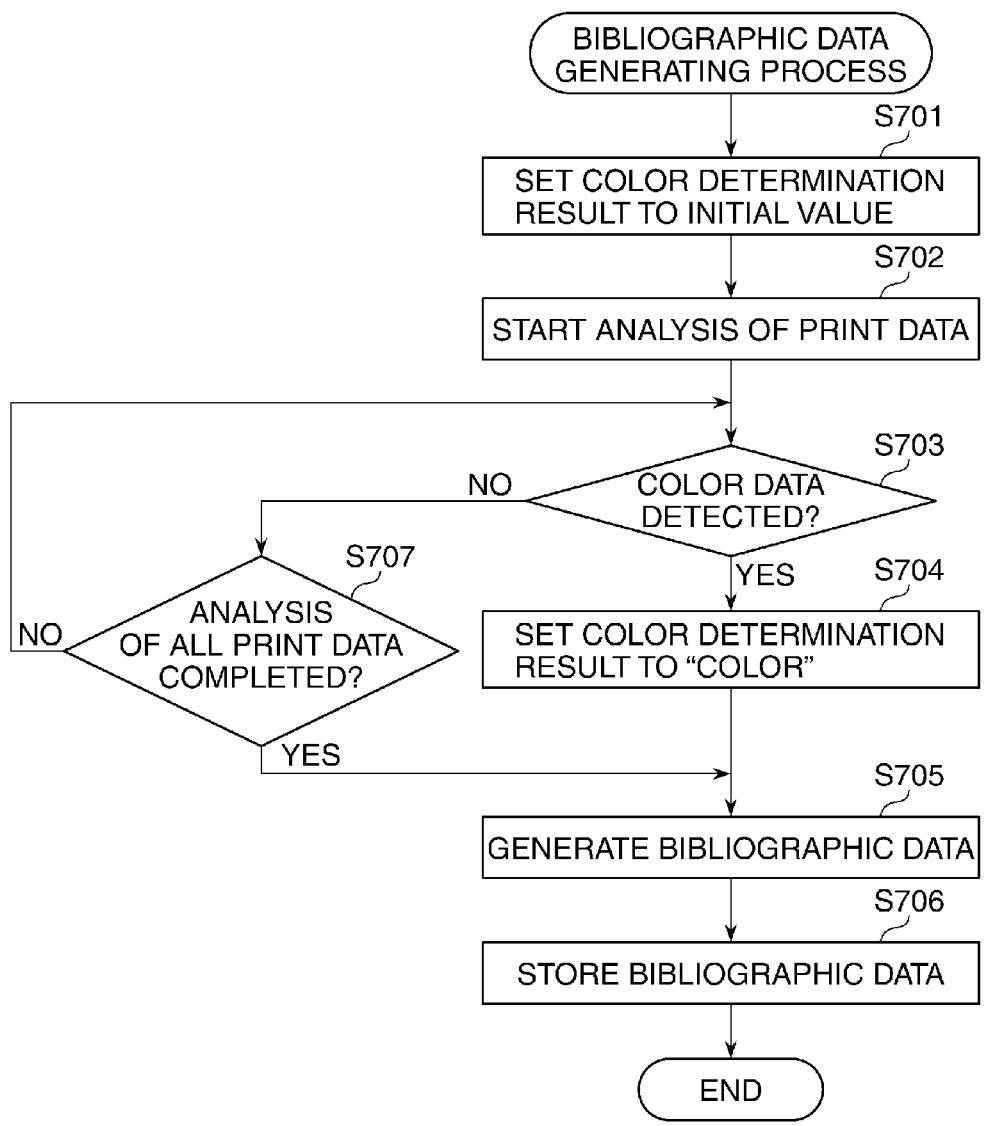
FIG. 7 is a flowchart of a bibliographic data generating process performed by the MFP.

FIG. 7 is a flowchart of the bibliographic data generating process performed by the MFP 103 appearing in FIG. 1.

Here, there is a case where even when print setting information is changed by operating the print setting change screen 603, the change in the print setting information is not reflected on the printing process. For example, in a case where print setting information is changed from the setting of monochrome printing to the setting of color printing, assuming that the printing process uses the print data 406 shown in FIG. 4B, since the print data 406 includes color data and hence can also be used for color printing, a change of the print setting information performed by the user on the print setting change screen 603 is reflected on the printing process, whereby color printing is performed. On the other hand, assuming that the printing process uses the print data 400 shown in FIG. 4A, since the print data 400 does not contain color data and hence cannot be used for color printing, even after a change of the print setting information performed by the user on the print setting change screen 603, it is impossible to perform color printing.

To cope with this, in the present embodiment, when a print data item acquired from the authentication print server 102 does not contain color data, the color mode 604 is displayed on the print setting change screen 603 in such a manner that no other settings than "monochrome" for performing monochrome printing are selected.

The bibliographic data generating process in FIG. 7 is performed by the CPU 212 that executes the software module 300 loaded in the RAM 214. It is assumed that the bibliographic data generating process is performed on one print data item, and in a case where a plurality of print data items are stored in the step S504, the bibliographic data generating process is individually performed on each print data item.

Referring to FIG. 7, first, the CPU 212 sets the color determination result corresponding to the color determination result 422 of the bibliographic data 411 to an initial value, e.g. "monochrome" (step S701). In the present embodiment, print data items are each classified into a print data item which can be used for color printing or a print data item which can be used for monochrome printing, according to a result of color determination performed by analyzing the print data item in the bibliographic data generating process. For example, when a print data item is print data which can be used for only monochrome printing, the print data item is classified by color determination as "monochrome", whereas when a print data item is print data which can be used for both monochrome printing and color printing, the print data item is classified by color determination as "color". In the step S701, however, the color determination result is provisionally set to an initial value ("monochrome" in the above-mentioned example). Then, the CPU 212 starts to analyze the stored print data (step S702), and it is determined whether or not color data has been detected from the stored print data (step S703). For example, since in the print data 400 in FIG. 4A, the setting item 405 of color data included in the data section 402 is set to the setting of "eGray", the CPU 212 determines that no color data has been detected from the print data 400. On the other hand, in the print data 406 in FIG. 4B, a setting item 423 of color data included in the data section 408 is set to "RGB" indicative of color data, and hence the CPU 212 determines that color data has been detected from the print data 400.

If it is determined in the step S703 that color data has been detected from the stored print data, the CPU 212 determines that the print data can be used for color printing, and sets the color determination result to be set in the bibliographic data 411 to "color" (step S704). Then, the CPU 212 generates the bibliographic data 411 based on the set color determination result and the print data (step S705). The color determination result 422 of the bibliographic data 411 is set to "color" based on the set color determination result. Here, when the color determination result 422 of the bibliographic data 411 has a setting of "color", the CPU 212 generates display data for displaying the print setting change screen 603 which displays a button corresponding to a setting of "color" in the color mode 604 in a selectable manner. Note that in this case, the display data is generated such that in the color mode 604 of the print setting change screen 603, not only a button associated with the setting of "color" for performing color printing but also buttons for other settings are not grayed out but are displayed in a selectable manner. Then, the CPU 212 stores the generated bibliographic data 411 in the external storage device 221 (step S706), followed by terminating the present process.

If it is determined in the step S703 that no color data has been detected from the stored print data, the CPU 212 determines whether or not analysis of all the print data items has been completed (step S707).

If it is determined in the step S707 that analysis of any of the print data items has not been completed, the CPU 212 returns to the step S703. On the other hand, if it is determined in the step S707 that analysis of all the print data items has been completed, the CPU 212 proceeds to the step S705. In this case, the CPU 212 determines that the print data cannot be used for color printing. As a consequence, the color determination result 422 of the bibliographic data 411 is set to "monochrome" set in the step S701 without change. Here, in the case where the color determination result 422 of the bibliographic data 411 is set to "monochrome", the CPU 212 generates display data for displaying the print setting change screen 603 in such a manner as to suppress a change in the color mode 604 of the print data associated with the bibliographic data 411. More specifically, to prevent selection of the settings of "color" and "two colors" other than the setting of "monochrome" for performing monochrome printing, display data is generated such that in the color mode 604 of the print setting change screen 603, the buttons associated with "color" and "two colors" are grayed out (see FIG. 6B). This makes it impossible for the user to change print setting information associated with the color mode 604 of the print setting change screen 603 by operating the print setting change screen 603. Thereafter, the CPU 212 executes the step S706, followed by terminating the present process.

According to the above-described display data generating process in FIG. 5 and bibliographic data generating process in FIG. 7, in a case where print data transmitted from the authentication print server 102 is acquired, if the acquired print data does not contain color data, the color mode 604 is displayed on the print setting change screen 603 such that no other settings than "monochrome" for performing monochrome printing are selected. Here, the MFP 103 cannot perform color printing based on print data which does not contain color data, and in a case where print data for which the print setting change screen 603 is to be displayed does not contain color data, the print setting change screen 603 is displayed such that for the color mode 604, no other settings than "monochrome" for performing monochrome printing are selected. This makes it possible to prevent print setting information of print data transmitted from the authentication print server 102 and containing no color data from being changed from "monochrome" to "color" indicating color printing which cannot be performed using the color data.

The invention has been described heretofore based on the embodiment, but the invention is not limited to the above-described embodiment.

For example, in the above-described bibliographic data generating process in FIG. 7, a color determination result is set based on color data contained in stored print data. However, to perform color determination, a color determination result may be set based on pixel values of image data which is generated by performing rendering of print data using the image generation module 307 (operation of an image data generation unit). This makes it possible to perform color determination in a further detailed manner.

Further, in the above-described bibliographic data generating process in FIG. 7, the color determination result may be set based on information on a display language type of print data.

Figure 8:
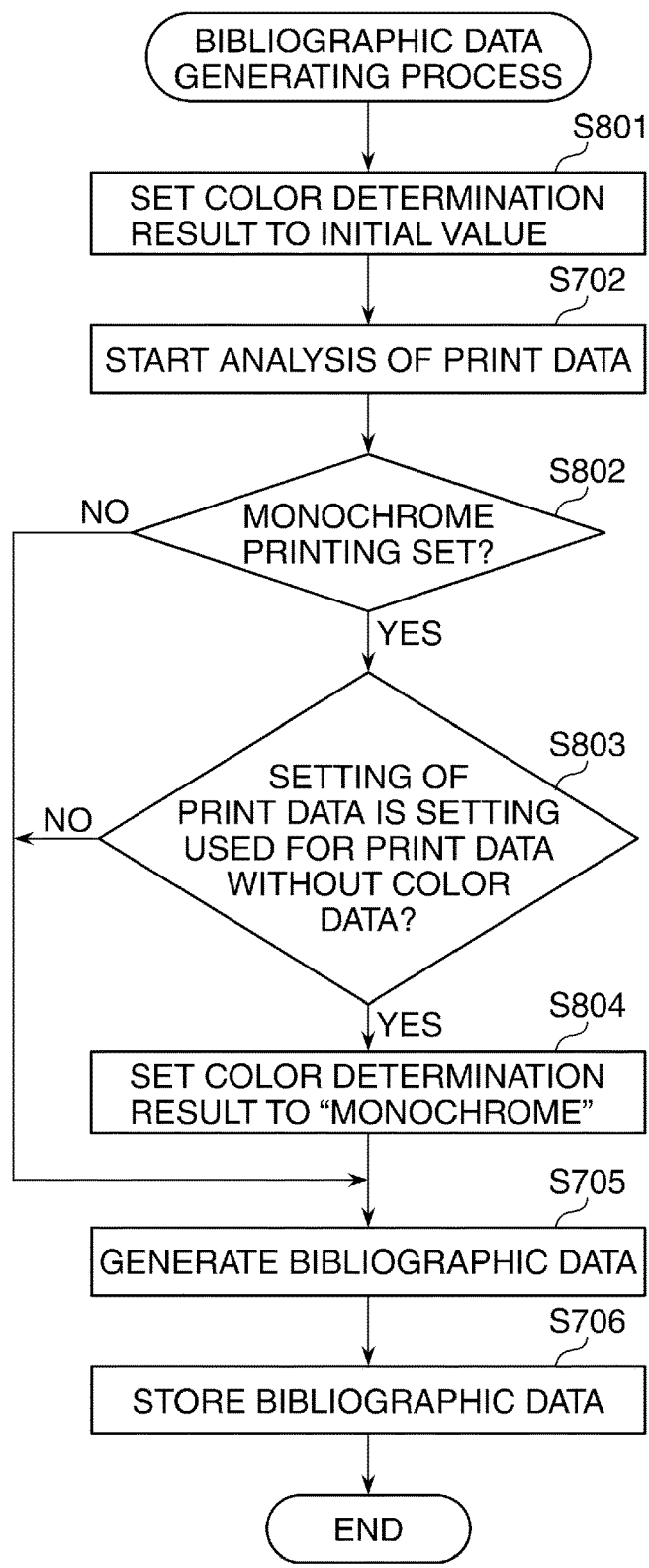
FIG. 8 is a flowchart of a variation of the bibliographic data generating process in FIG. 7.

FIG. 8 is a flowchart of a variation of the bibliographic data generating process in FIG. 7.

The variation of the bibliographic data generating process shown in FIG. 8 is performed by the CPU 212 that executes the software module 300 loaded in the RAM 214. It is assumed that the bibliographic data generating process is performed on one print data item, and in a case where a plurality of print data items are stored in the step S504, the variation of the bibliographic data generation process in FIG. 8 is individually performed on each print data item.

Referring to FIG. 8, first, the CPU 212 sets the color determination result of the bibliographic data 411 to an initial value, e.g. "color" (step S801), and performs the same processing as in the step 702. Then, the CPU 212 determines whether or not a setting of a color mode (e.g. the color mode 403 or 409) included in a header section (e.g. the header section 401 or 407) of the print data is set to "MONO", i.e. whether or not monochrome printing is set (step S802).

If it is determined in the step S802 that monochrome printing is set, the CPU 212 determines whether or not a setting of description language setting information included in the header section of the print data indicates a description language used for expressing print data which does not contain color data (step S803). Normally, in a case where print data including PDL data, i.e. print data written in a page description language of PCLXL, is set to monochrome printing, the print data does not contain color data since the print data has been converted to gray scale data. For this reason, in the present embodiment, the CPU 212 determines that the setting of "PCLXL" in the description language setting information 404 of the print data 400 is a setting indicative of a description language used for expressing print data which does not contain color data, whereas a setting other than "PCLXL", e.g. a setting of "TIFF" in the description language setting information 410 of the print data 406 is a setting indicative of a description language used for expressing print data which contains color data.

Figures 6A, 6B:
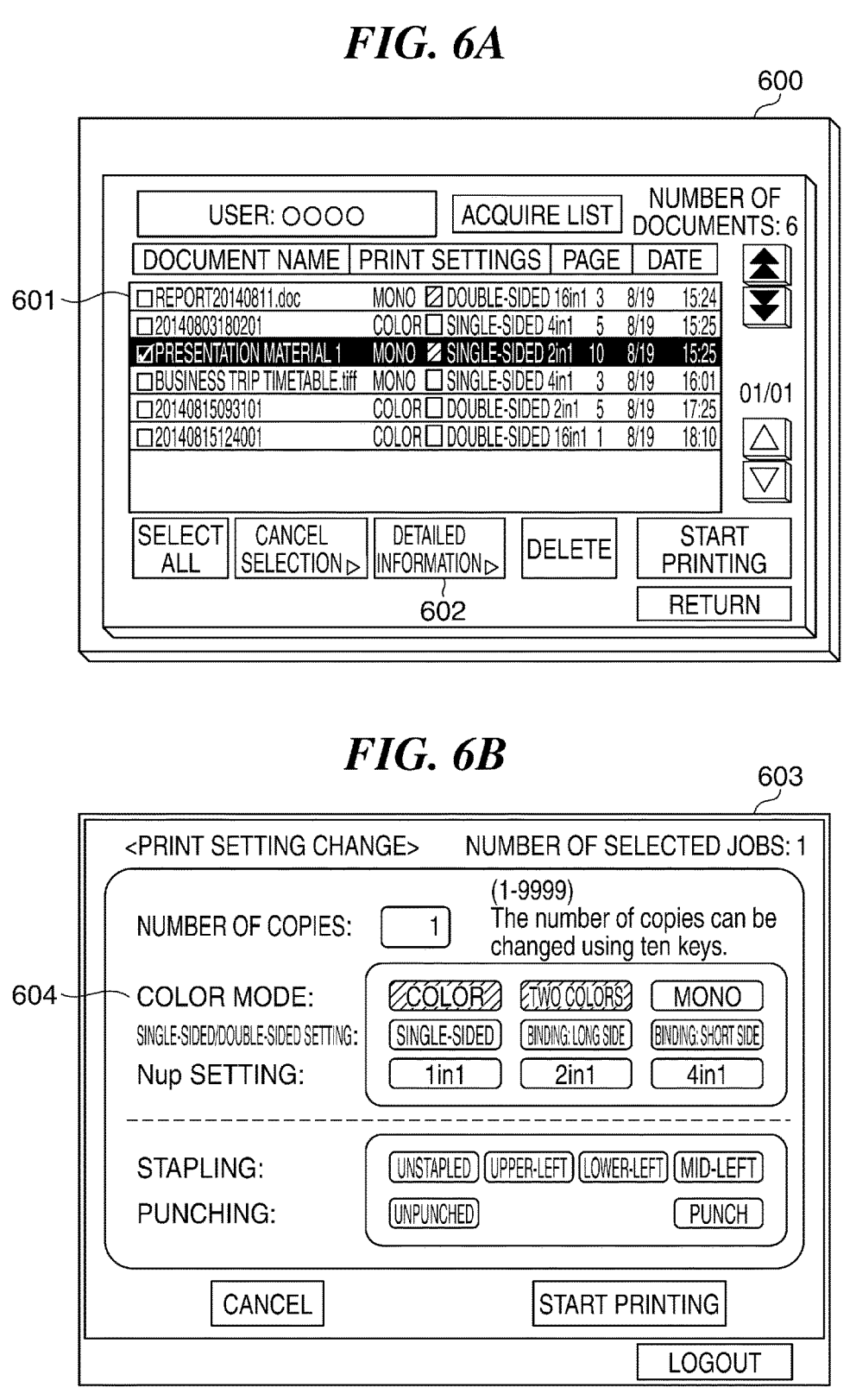

If it is determined in the step S803 that the setting of the description language setting information included in the header section of the print data is a setting indicative of a description language used for expressing print data which does not contain color data, the CPU 212 determines that the print data cannot be used for color printing, and sets the color determination result to be set as the color determination result 422 of the bibliographic data 411 to "monochrome" (step S804). Then, the CPU 212 executes the step S705, similar to the bibliographic data generating process in FIG. 7. As a consequence, the color determination result 422 of the bibliographic data 411 is set to "monochrome" based on the set color determination result, and as shown in FIG. 6B, the print setting change screen 603 is displayed in a manner such that for the color mode 604, no other settings than "monochrome" for performing monochrome printing can be selected. Then, the CPU 212 executes the step S706, similar to the bibliographic data generating process in FIG. 7, followed by terminating the present process.

If it is determined in the step S802 that printing other than monochrome printing is set, or if it is determined in the step S803 that the setting of the description language setting information included in the header section of the print data is a setting indicative of a description language used for expressing print data which contains color data, the CPU 212 determines that the print data can be used for color printing, and executes the step S705. With this, the color determination result 422 of the bibliographic data 411 is set to "color" set in the step S801 without change. Then, the CPU 212 executes the step S706, followed by terminating the present process.

According to the process described above with reference to FIG. 8, a color determination result is set based on a setting of description language setting information included in a header section of print data. This makes it possible to easily determine whether or not the print data can be used for color printing without acquiring other information than the print data.

Next, a description will be given of a second embodiment of the invention.

The second embodiment basically has the same configuration and the same effects as the above-described first embodiment, but it is distinguished from the first embodiment in that it can accept an instruction for changing print setting information of print data even if the print data is data which cannot be used for color printing. Therefore, redundant description of the same configuration and the same effects is omitted, while denoting the same elements by the same reference numerals, and the following description will be given of different configuration and different effects from the first embodiment.

Figure 9A:
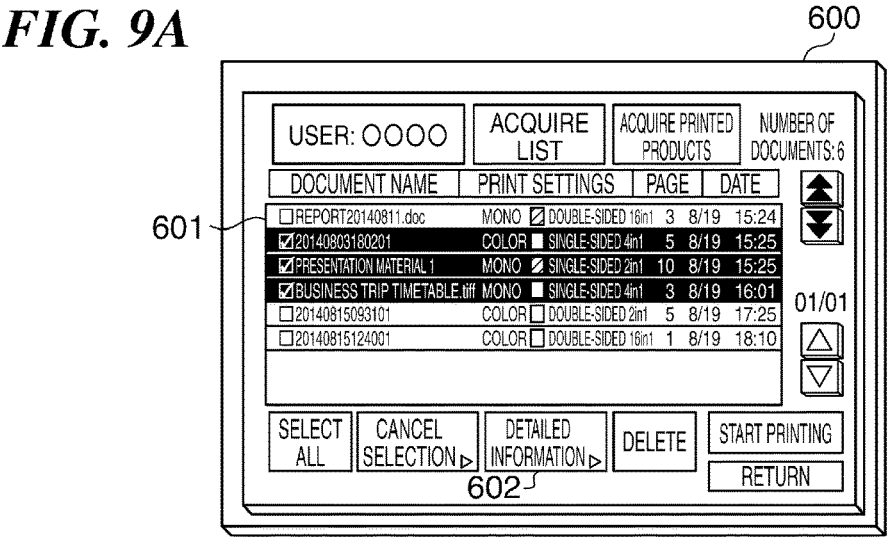
FIG. 9A is a view of a print data list screen as an example of the various setting screens displayed on the display section of the MFP.

In the present embodiment, as shown in FIG. 9A, when the user selects a plurality of print data items from the print data information group 601, and presses the detailed information button 602 on the print data list screen 600, display data for displaying the print setting change screen 603 is generated based on a bibliographic data item 411 associated with each of the selected print data items. Further, it is possible to change print setting information of all the selected print data items in a batch, i.e. collectively, on the print setting change screen 603 displayed on the display section 210, using the generated display data.

Figure 10A:
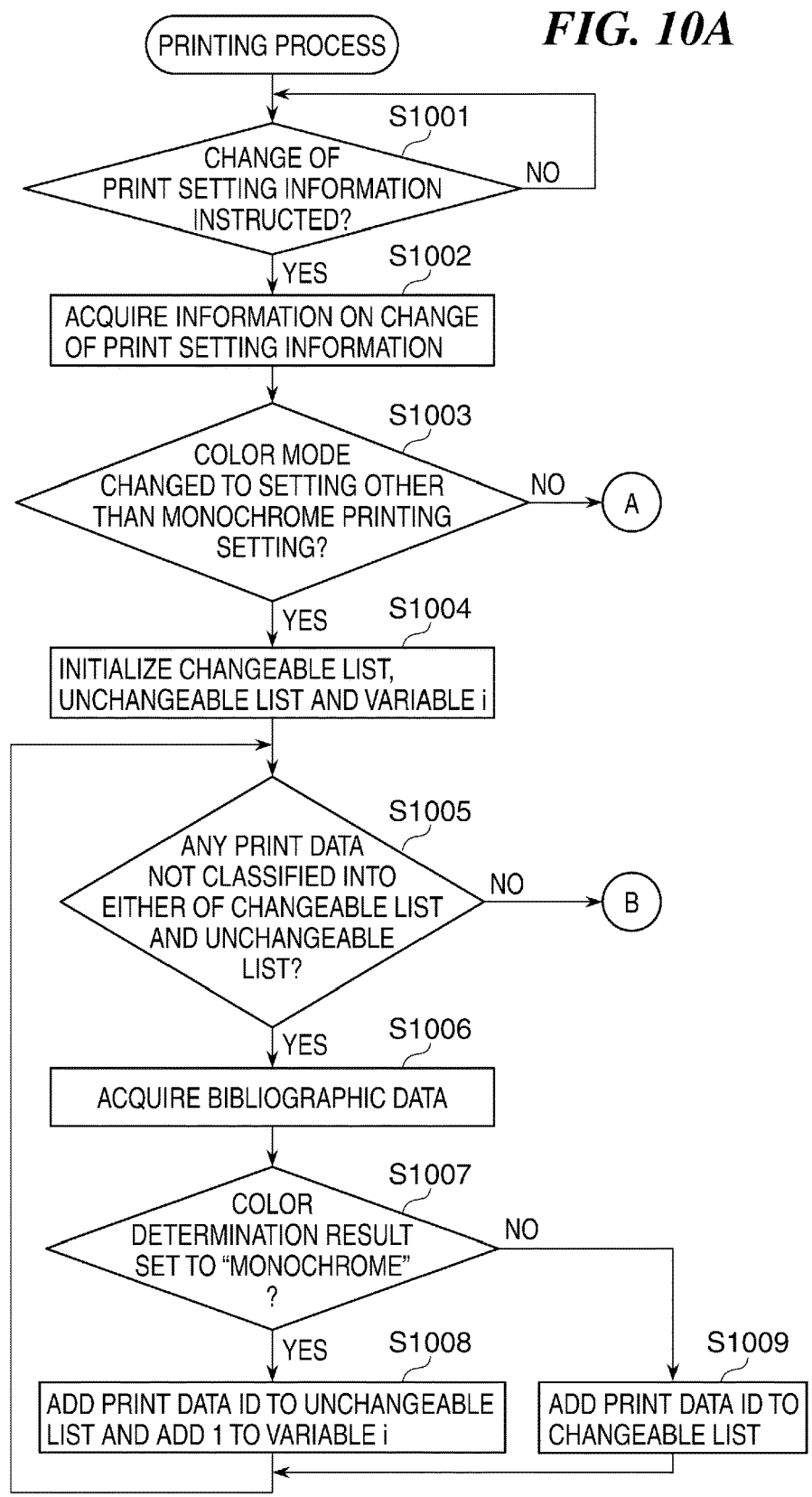
FIG. 10A is a flowchart of a printing process performed by an MFP as an image forming apparatus according to a second embodiment of the invention.
Figure 10B:
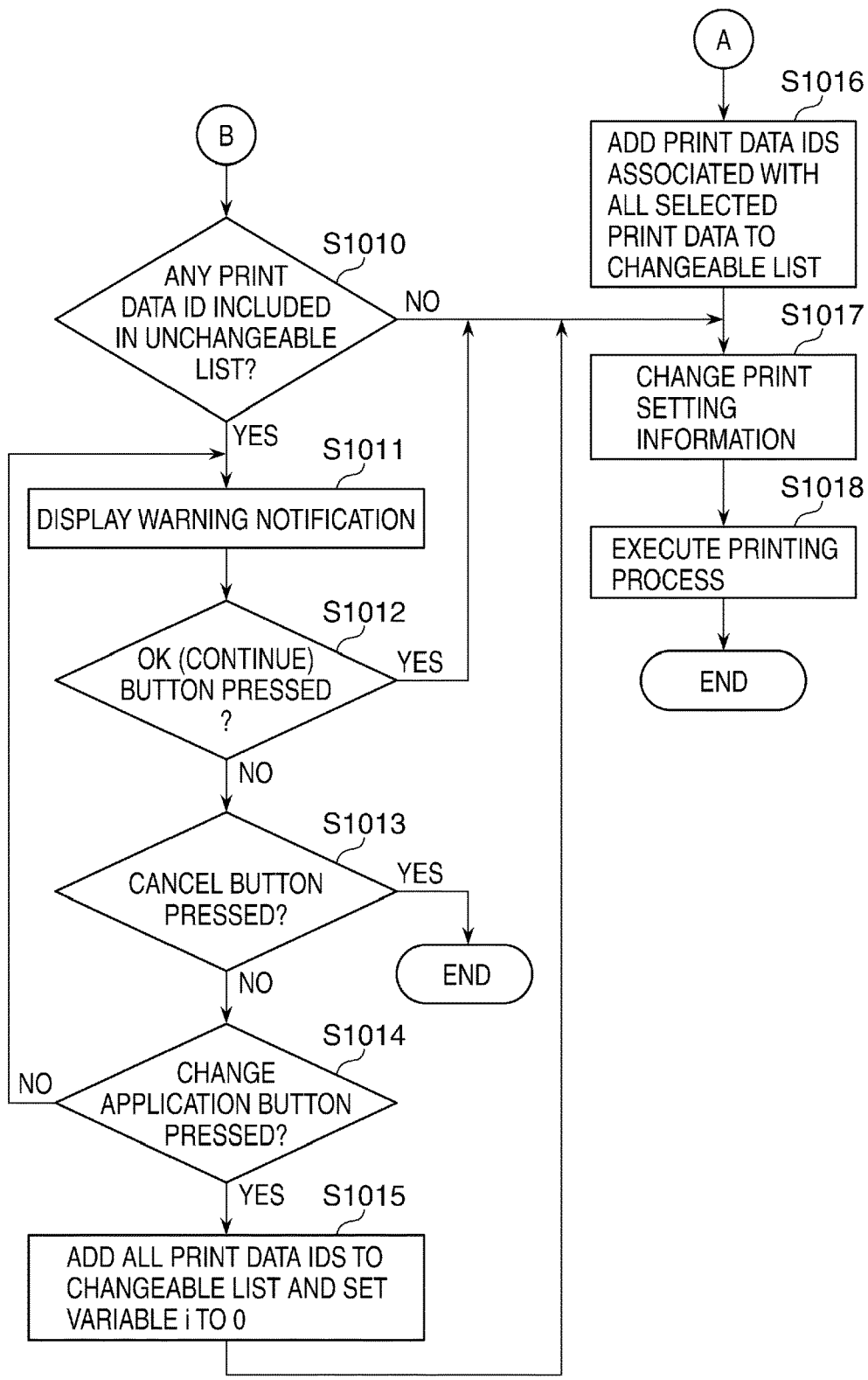
FIG. 10B is a continuation of FIG. 10A.

FIGS. 10A and 10B are a flowchart of a printing process performed by the MFP 103 according to the second embodiment.

In the display data generating process described above with reference to FIG. 5, including the bibliographic data generating process shown FIG. 7 or the variation of the bibliographic data generating process shown in FIG. 8, the description has been given of the case where to change print setting information associated with each of a plurality of print data items, the user causes a print setting change screen 603 associated with each print data item to be individually displayed, and checks whether or not the color mode 604 can be changed from the print setting change screen 603. However, there is a case where when performing the printing process using print data items, if the number of the print data items is large, it is sometimes difficult to check whether or not the color mode 604 of each of all the print data items can be changed since it takes much time and labor to individually display each print setting change screen 603.

To cope with this, in the printing process shown in FIGS. 10A and 10B, it is made possible to change print setting information of a plurality of print data items in a batch. Further even when an instruction for changing print setting information of each print data item is accepted, print setting information of print data which cannot be used for color printing is not changed, but there is displayed a warning notification 901, described hereinafter with reference to FIG. 9B, to the effect that the print setting information is not changed.

The printing process shown in FIGS. 10A and 10B is performed by the CPU 212 of the MFP 103 that executes the software module 300 loaded in the RAM 214. In this printing process, it is presupposed that a plurality of print data items have been selected on the print data list screen 600.

Referring to FIG. 10A, first, when the CPU 212 of the MFP 103 accepts an instruction for changing print setting information of a plurality of print data items according to an operation performed on the print setting change screen 603 (YES to a step S1001) (operation of a reception unit), the CPU 212 acquires the print data items selected on the print data list screen 600, and acquires information on changes in the print setting information instructed to be changed on the print setting change screen 603 (step S1002). Then, the CPU 212 determines whether or not the color mode 604 has been changed to a setting other than "monochrome" for performing monochrome printing (step S1003).

If it is determined in the step S1003 that the color mode 604 has been changed to a setting other than "monochrome" for performing monochrome printing, the CPU 212 initializes a changeable print data list for managing print data items of which the setting of the color mode 604 is allowed to be changed, an unchangeable print data list for managing print data items of which the setting of the color mode 604 is not allowed to be changed, and a variable i indicative of the number of print data items of which the setting of the color mode 604 is not allowed to be changed (step S1004). At this time, the variable i is initialized to 0. Then, the CPU 212 starts a classification process for classifying each print data item into one of the changeable print data list and the unchangeable print data list, and determines whether or not among the selected print data items, there is a print data item that is not classified into either of the changeable print data list and the unchangeable print data list (step S1005).

If it is determined in the step S1005 that there is a print data item that is not classified into either of the changeable print data list and the unchangeable print data list, the CPU 212 acquires a bibliographic data 411 associated with the print data item (step S1006). For the acquired bibliographic data 411, the bibliographic data 411 stored in the step S706 of the bibliographic data generating process in FIG. 7, for example, is used. Then, the CPU 212 determines whether or not the color determination result 422 of the acquired bibliographic data 411 is "monochrome" (step S1007).

If it is determined in the step S1007 that the color determination result 422 of the acquired bibliographic data 411 is "monochrome", the CPU 212 classifies the print data item associated with the acquired bibliographic data 411 as a print data item of which the setting of the color mode 604 is not allowed to be changed since the print data item cannot be used for color printing, and adds a print data ID 415 associated with the print data item to the unchangeable print data list and adds 1 to the variable i (step S1008). Then, the CPU 212 returns to the step S1005.

If it is determined in the step S1007 that the color determination result 422 of the acquired bibliographic data 411 indicates a setting other than "monochrome", the CPU 212 classifies the print data item associated with the acquired bibliographic data 411 as a print data item of which the setting of the color mode 604 is allowed to be changed. Then, the CPU 212 adds the print data ID 415 associated with the print data to the changeable print data list (step S1009), and returns to the step S1005.

If it is determined in the step S1005 that there is no print data item that is not classified into either of the changeable print data list and the unchangeable print data list (NO to the step S1005), the process proceeds to a step S1010 in FIG. 10B, wherein the CPU 212 determines whether or not the unchangeable print data list includes any print data ID 415. In the present embodiment, when the variable i is larger than 0, the CPU 212 determines that the unchangeable print data list includes at least one print data ID 415, whereas when the variable i is equal to 0, the CPU 212 determines that the unchangeable print data list does not include any print data ID 415.

Figure 9B:
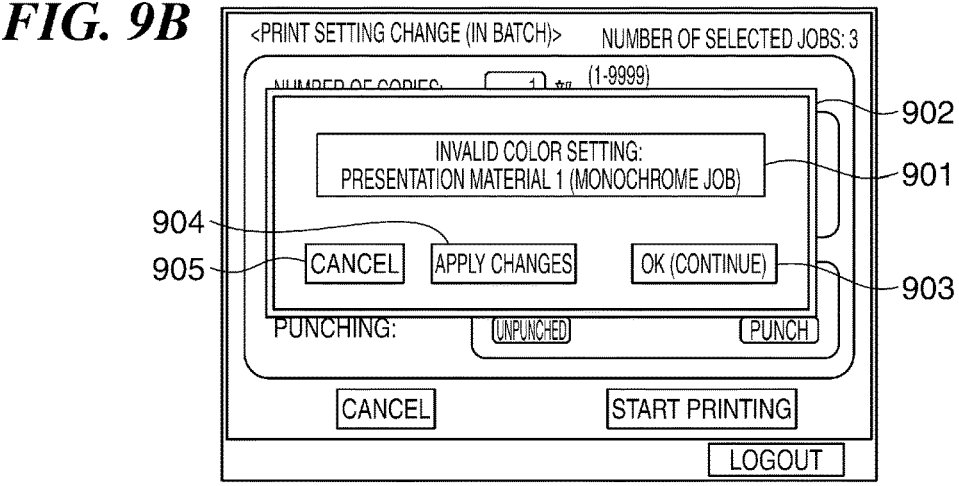
FIG. 9B is a view of a dialog screen including a warning notification as an example of the various setting screens displayed on the display section of the MFP.

If it is determined in the step S1010 that the unchangeable print data list includes at least one print data ID 415, the CPU 212 displays, on the display section 210, a dialog screen 902 shown in FIG. 9B, which includes the warning notification 901 for notifying the at least one print data item of which the setting of the color mode 604 is not allowed to be changed, based on the unchangeable print data list (step S1011). The dialog screen 902 includes not only the warning notification 901 but also an OK (continue) button 903 for changing a setting of print setting information other than the color mode 604 of the print data notified by the warning notification 901, a change application button 904 for changing settings of all the print setting information items including the color mode 604 of the print data item notified by the warning notification 901, and a cancel button 905 for aborting the processing for changing the print setting information. Then, the CPU 212 determines whether or not the OK (continue) button 903 has been pressed (step S1012).

If it is determined in the step S1012 that the OK (continue) button 903 has not been pressed, the CPU 212 determines whether or not the cancel button 905 has been pressed (step S1013).

If it is determined in the step S1013 that the cancel button 905 has been pressed, the CPU 212 terminates the present process, whereas if it is determined in the step S1013 that the cancel button 905 has not been pressed, the CPU 212 determines whether or not the change application button 904 has been pressed (step S1014).

If it is determined in the step S1014 that the change application button 904 has been pressed, the CPU 212 adds all the print data IDs 415 included in the unchangeable print data list to the changeable print data list and sets the variable i to 0 (step S1015). Then, the CPU 212 proceeds to a step S1017, referred to hereinafter.

If it is determined in the step S1014 that the change application button 904 has not been pressed, the CPU 212 returns to the step S1011.

If it is determined in the step S1010 that the unchangeable print data list does not include any print data ID 415, or if it is determined in the step S1012 that the OK (continue) button 903 has been pressed, the CPU 212 proceeds to the step S1017.

On the other hand, if it is determined in the step S1003 in FIG. 10A that the color mode has been changed to monochrome printing (NO to the step S1003), the CPU 212 adds print data IDs 415 associated with all the selected print data items to the changeable print data list (step S1016 in FIG. 10B). Then, the CPU 212 changes the print setting information of each of the print data items associated with the print data IDs 415 included in the changeable print data list, based on settings made by operating the print setting change screen 603 (step S1017), and performs printing of each print data item (step S1018), followed by terminating the present process.

As described hereinabove, according to the printing process described above with reference to FIGS. 10A and 10B, even when an instruction for changing print setting information is received in response to an operation performed on the print setting change screen 603, print setting information of print data that cannot be used for color printing is not changed, but the warning notification 901 is displayed to the effect that the print setting information of the print data is not changed. This makes it possible not only to positively prevent the print setting information of the print data from being changed from "monochrome" to e.g. "color" according to which printing cannot be executed, but also to prevent the user from being confused by the fact that the print setting information is not changed. Further, even when the warning notification 901 to the effect that the print setting information is not changed is displayed, if the change application button 904 is pressed, it means that the user has given an instruction of a change to invalid print setting information after becoming acquainted with the warning, which makes it possible to prevent the user from having an unintended result without being acquainted with the impossibility of the change.

Figure 9C:
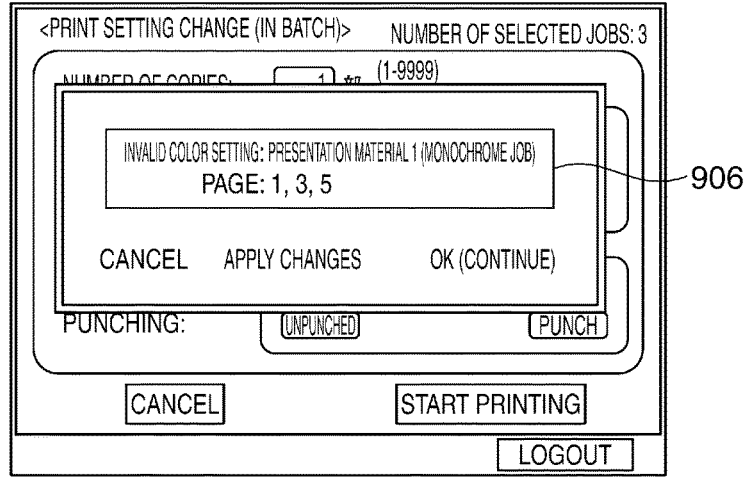
FIG. 9C is a view of another example of the dialog screen including a warning notification as an example of the various setting screens displayed on the display section of the MFP.

In the above-described printing process in FIGS. 10A and 10B, in a case where print data for printing a plurality of pages allows print setting information of each of print data items associated with the respective pages to be individually set, there may be displayed, as shown in FIG. 9C, there may be displayed a warning notification 906 to the effect that the print setting information is not changed, which includes information on pages corresponding to print data items of which the setting of the color mode 604 is not allowed to be changed.

As described hereinabove, although in the display data generating process in FIG. 5, including the bibliographic data generating process in FIG. 7 or the variation of the bibliographic data generating process in FIG. 8, and the printing process in FIGS. 10A and 10B, the bibliographic data 411 generated by the MFP 103 is used, the authentication print server 102 may generate bibliographic data, and the generated bibliographic data may be used by the MFP 103.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-041462 filed Mar. 3, 2015 which is hereby incorporated by reference herein in its entirety.

What is claimed is:

1. An image forming apparatus including a storage configured to store data, an image forming device configured to form an image on a sheet, and a display device configured to display information of a user and configured to receive an instruction from the user, the image forming apparatus comprising:
  a controller, including a processor configured to execute instructions stored in a memory or including circuitry, the controller configured to:
    acquire first print data including a chromatic content to be printed and color mode information indicating that the content is to be printed in black-and-white, and store the first print data in the storage so as to enable the user to input, through the display device, an instruction for causing the image forming device to form an image based on the first print data;
    acquire second print data including a non-chromatic content to be printed and color mode information indicating that the content is to be printed in black-and-white, and store the second print data in the storage so as to enable the user to input, through the display device, an instruction for executing an instruction for causing the image forming device to form an image based on the second print data, wherein the non-chromatic content is generated by converting chromatic content to non-chromatic content; and
    receive, through the display device, an instruction for selecting one print data from among a list of a plurality of print data including the first print data and the second print data,
  wherein the controller causes the display device to display a first screen through which color mode information of the selected print data can be changed by selecting from among a plurality of modes including a color mode and a monochrome mode based on information indicating that the selected print data is the first print data, and
  wherein the controller causes the display device to display a second screen through which color mode information of the selected print data cannot be changed by selecting from among a plurality of modes including a color mode and a monochrome mode based on information indicating that the selected print data is the second print data.

2. The image forming apparatus according to claim 1, wherein when the content is not a chromatic content, the display device is configured to display a notification that the color mode information cannot be changed.

3. The image forming apparatus according to claim 1, wherein the controller is further configured to change the color mode information based on the instruction for changing the color mode information received by the display device,
  wherein even when the display device has received the instruction for changing the color mode information, the controller is configured to not change the color mode information of print data including a content which is not a chromatic content, and
  wherein the display device is configured to display a warning notification to the effect that the color mode information is not changed.

4. The image forming apparatus according to claim 3, wherein in a case where print data for printing a plurality of pages is to be printed, the controller is configured to individually change color mode information of each of respective print data items associated with the plurality of pages,
  wherein in a case where the display device has received an instruction for changing the color mode information of a print data item associated with each of the plurality of pages, the controller is configured to not change the color mode information of a print data item corresponding to a page which is not a chromatic content, and
  wherein the display device is configured to display a warning notification to the effect that the color mode information of the print data corresponding to the page which is not a chromatic content is not changed.

5. The image forming apparatus according to claim 1, wherein the controller is further configured to generate image data by performing rendering based on the print data, and
  wherein it is determined, based on the generated image data, whether or not the content included in the print data is a chromatic content.

6. The image forming apparatus according to claim 1, wherein the print data is expressed in a page description language that can be interpreted by the image forming apparatus, and
  wherein it is determined, based on the page description language, whether or not the content included in the print data is a chromatic content.

7. A method of controlling an image forming apparatus having a storage configured to store data, an image forming device configured to form an image on a sheet, and a display device configured to display information of user and configured to receive an instruction from the user, the method comprising:
  acquiring first print data including a chromatic content to be printed and color mode information indicating that the content is to be printed in black-and-white, and storing the first print data in the storage so as to enable the user to input, through the display device, an instruction for causing the image forming device to form an image based on the first print data;
  acquiring second print data including a non-chromatic content to be printed and color mode information indicating that the content is to be printed in black-and-white, and storing the second print data in the storage so as to enable the user to input, through the display device, an instruction for executing an instruction for causing the image forming device to form an image based on the second print data, wherein the non-chromatic content is generated by converting chromatic content to non-chromatic content;

receiving, through the display device, an instruction for selecting one print data from among a list of a plurality of print data including the first print data and the second print data;

causing the display device to display a first screen through which color mode information of the selected print data can be changed by selecting from among a plurality of modes including a color mode and a monochrome mode based on information indicating that the selected print data is the first print data; and causing the display device to display a second screen through which color mode information of the selected print data cannot be changed by selecting from among a plurality of modes including a color mode and a monochrome mode based on information indicating that the selected print data is the second print data.

8. A non-transitory computer-readable storage medium storing a computer-executable program for executing a method of controlling an image forming apparatus having a storage configured to store data, an image forming device configured to form an image on a sheet, and a display device configured to display information of a user and configured to receive an instruction from the user, wherein the method comprises:

acquiring first print data including a chromatic content to be printed and color mode information indicating that the content is to be printed in black-and-white, and storing the first print data in the storage so as to enable the user to input, through the display device, an instruction for causing the image forming device to form an image based on the first print data;

acquiring second print data including a non-chromatic content to be printed and color mode information indicating that the content is to be printed in black-and-white, and storing the second print data in the storage so as to enable the user to input, through the display device, an instruction for executing an instruction for causing the image forming device to form an image based on the second print data, wherein the non-chromatic content is generated by converting chromatic content to non-chromatic content;

receiving, through the display device, an instruction for selecting one print data from among a list of a plurality of print data including the first print data and the second print data;

causing the display device to display a first screen through which color mode information of the selected print data can be changed by selecting from among a plurality of modes including a color mode and a monochrome mode based on information indicating that the selected print data is the first print data; and causing the display device to display a second screen through which color mode information of the selected print data cannot be changed by selecting from among a plurality of modes including a color mode and a monochrome mode based on information indicating that the selected print data is the second print data.

9. An image forming apparatus which uses a storage configured to store data, an image forming device configured to form an image on a sheet and a display device configured to display information of a user and configured to receive an instruction from the user, the image forming apparatus comprising:

a controller, including a processor which executes instructions stored in a memory or having circuitry, the controller configured to:

acquire first print data including a chromatic content to be printed and color mode information indicating that the content is to be printed in black-and-white, and store the first print data in the storage so as to enable the user to input, through the display device, an instruction for causing the image forming device to form an image based on the first print data;

acquire second print data including a non-chromatic content to be printed and color mode information indicating that the content is to be printed in black-and-white, and store the second print data in the storage so as to enable the user to input, through the display device, an instruction for executing an instruction for causing the image forming device to form an image based on the second print data; and receive, through the display device, an instruction for selecting one print data from among a list of a plurality of print data including the first print data and the second print data, wherein the controller causes the display device to display a notification indicating that the color mode information should not be changed to a color mode based on information indicating that the selected print data is the second print data, in a case where an instruction for changing the color mode information of the acquired selected print data to the color mode is received, but not display the notification based on information indicating that the received print data is the first print data, in a case where an instruction for changing the color mode information of the selected print data to the color mode is received.

10. The image forming apparatus according to claim 9, wherein when the content is not a chromatic content, the display device is configured to display a notification that the color mode information cannot be changed.

11. The image forming apparatus according to claim 9, wherein the controller is further configured to change the color mode information based on the instruction for changing the color mode information received by the display device, wherein even when the display device has received the instruction for changing the color mode information, the controller is configured to not change the color mode information of print data including a content which is not a chromatic content, and wherein the display device is configured to display a warning notification to the effect that the color mode information is not changed.

12. The image forming apparatus according to claim 11, wherein in a case where print data for printing a plurality of pages is to be printed, the controller is configured to individually change color mode information of each of respective print data items associated with the plurality of pages, wherein in a case where the display device has received an instruction for changing the color mode information of a print data item associated with each of the plurality of pages, the controller is configured to not change the color mode information of a print data item corresponding to a page which is not a chromatic content, and wherein the display device is configured to display a warning notification to the effect that the color mode information of the print data corresponding to the page which is not a chromatic content is not changed.

13. The image forming apparatus according to claim 9, wherein the controller is further configured to generate image data by performing rendering based on the print data, and wherein it is determined, based on the generated image data, whether or not the content included in the print data is a chromatic content.

14. The image forming apparatus according to claim 9, wherein the print data is expressed in a page description language that can be interpreted by the image forming apparatus, and wherein it is determined, based on the page description language, whether or not the content included in the print data is a chromatic content.

15. A method of controlling an image forming apparatus which uses a storage configured to store data, an image forming device configured to form an image on a sheet and a display device configured to display information of a user and configured to receive an instruction from the user, the method comprising:

acquiring first print data including a chromatic content to be printed and color mode information indicating that the content is to be printed in black-and-white, and storing the first print data in the storage so as to enable the user to input, through the display device, an instruction for causing the image forming device to form an image based on the first print data;

acquiring second print data including a non-chromatic content to be printed and color mode information indicating that the content is to be printed in black-and-white, and storing the second print data in the storage so as to enable the user to input, through the display device, an instruction for executing an instruction for causing the image forming device to form an image based on the second print data;

receiving, through the display device, an instruction for selecting one print data from among a list of a plurality of print data including the first print data and the second print data; and causing the display device to display a notification indicating that the color mode information should not be changed to a color mode based on information indicating that the selected print data is the second print data, in a case where an instruction for changing the color mode information of the selected print data to the color mode is received, but not display the notification based on information indicating that the received print data is the first print data, in a case where an instruction for changing the color mode information of the selected print data to the color mode is received.

16. A non-transitory computer-readable storage medium storing a computer-executable program for executing a method of controlling an image forming apparatus which uses a storage configured to store data, an image forming device configured to form an image on a sheet and a display device configured to display information of a user and configured to receive an instruction from the user, the method comprising:

acquiring first print data including a chromatic content to be printed and color mode information indicating that the content is to be printed in black-and-white, and storing the first print data in the storage so as to enable the user to input, through the display device, an instruction for causing the image forming device to form an image based on the first print data;

acquiring second print data including a non-chromatic content to be printed and color mode information indicating that the content is to be printed in black-and-white, and storing the second print data in the storage so as to enable the user to input, through the display device, an instruction for executing an instruction for causing the image forming device to form an image based on the second print data;

receiving, through the display device, an instruction for selecting one print data from among a list of a plurality of print data including the first print data and the second print data; and causing the display device to display a notification indicating that the color mode information should not be changed to a color mode based on information indicating that the acquired selected print data is the second print data, in a case where an instruction for changing the color mode information of the selected print data to the color mode is received, but not display the notification based on information indicating that the received print data is the first print data, in a case where an instruction for changing the color mode information of the selected print data to the color mode is received.

17. An image forming apparatus which uses a storage configured to store data, an image forming device configured to form an image on a sheet and a display device configured to display information of a user and configured to receive an instruction from the user, the image forming apparatus comprising:

a controller, including a processor which executes instructions stored in a memory or having circuitry, the controller configured to:

acquire first print data including a chromatic content to be printed and color mode information indicating that the content is to be printed in black-and-white, and store the first print data in the storage so as to enable the user to input, through the display device, an instruction for causing the image forming device to form an image based on the first print data;

acquire second print data including a non-chromatic content to be printed and color mode information indicating that the content is to be printed in black-and-white, and store the second print data in the storage so as to enable the user to input, through the display device, an instruction for executing an instruction for causing the image forming device to form an image based on the second print data; and receive, through the display device, an instruction for selecting one print data from among a list of a plurality of print data including the first print data and the second print data, wherein the controller causes the image forming device to print the selected print data in a color mode, based on an instruction for changing the color mode information of the selected print data to the color mode, in a case where it is determined that the selected print data is the first print data, and wherein the controller causes the image forming device to print the selected print data in a monochrome mode, even when an instruction for changing the color mode information of the selected print data to the color mode is received, in a case where it is determined that the selected print data is the second print data.

18. The image forming apparatus according to claim 17, wherein when the content is not a chromatic content, the display device is configured to display a notification that the color mode information cannot be changed.

19. The image forming apparatus according to claim 17, wherein the controller is further configured to change the color mode information based on the instruction for changing the color mode information received by the display device,
- wherein even when the display device has received the instruction for changing the color mode information, the controller is configured to not change the color mode information of print data including a content which is not a chromatic content, and
- wherein the display device is configured to display a warning notification to the effect that the color mode information is not changed.

20. The image forming apparatus according to claim 19, wherein in a case where print data for printing a plurality of pages is to be printed, the controller is configured to individually change color mode information of each of respective print data items associated with the plurality of pages,
- wherein in a case where the display device has received an instruction for changing the color mode information of a print data item associated with each of the plurality of pages, the controller is configured to not change the color mode information of a print data item corresponding to a page which is not a chromatic content, and
- wherein the display device is configured to display a warning notification to the effect that the color mode information of the print data corresponding to the page which is not a chromatic content is not changed.

21. The image forming apparatus according to claim 17, wherein the controller is further configured to generate image data by performing rendering based on the print data, and
- wherein it is determined, based on the generated image data, whether or not the content included in the print data is a chromatic content.

22. The image forming apparatus according to claim 17, wherein the print data is expressed in a page description language that can be interpreted by the image forming apparatus, and
- wherein it is determined, based on the page description language, whether or not the content included in the print data is a chromatic content.

23. A method of controlling an image forming apparatus which uses a storage configured to store data, an image forming device configured to form an image on a sheet and a display device configured to display information of a user and configured to receive an instruction from the user, the method comprising:
- acquiring first print data including a chromatic content to be printed and color mode information indicating that the content is to be printed in black-and-white, and storing the first print data in the storage so as to enable the user to input, through the display device, an instruction for causing the image forming device to form an image based on the first print data;
- acquiring second print data including a non-chromatic content to be printed and color mode information indicating that the content is to be printed in black-and-white, and storing the second print data in the storage so as to enable the user to input, through the display device, an instruction for executing an instruction for causing the image forming device to form an image based on the second print data;
- receiving, through the display device, an instruction for selecting one print data from among a list of a plurality of print data including the first print data and the second print data;
- causing the image forming device to print the selected print data in a color mode based on an instruction for changing the color mode information of the selected print data to the color mode, in a case where it is determined that the selected print data is the first print data; and
- causing the image forming device to print the selected print data in a monochrome mode, even when an instruction for changing the color mode information of the selected print data to the color mode is received, in a case where it is determined that the selected print data is the second print data.

24. A non-transitory computer-readable storage medium storing a computer-executable program for executing a method of controlling an image forming apparatus which uses a storage configured to store data, an image forming device configured to form an image on a sheet and a display device configured to display information of a user and configured to receive an instruction from the user, the method comprising:
- acquiring first print data including a chromatic content to be printed and color mode information indicating that the content is to be printed in black-and-white, and storing the first print data in the storage so as to enable the user to input, through the display device, an instruction for causing the image forming device to form an image based on the first print data;
- acquiring second print data including a non-chromatic content to be printed and color mode information indicating that the content is to be printed in black-and-white, and storing the second print data in the storage so as to enable the user to input, through the display device, an instruction for executing an instruction for causing the image forming device to form an image based on the second print data;
- receiving, through the display device, an instruction for selecting one print data from among a list of a plurality of print data including the first print data and the second print data;
- causing the image forming device to print the selected print data in a color mode based on an instruction for changing the color mode information to the color mode, in a case where it is determined that the selected print data is the first print data; and
- causing the image forming device to print the selected print data in a monochrome mode, even when an instruction for changing the color mode information of the selected print data to the color mode is received, in a case where it is determined that the selected print data is the second print data.

* * * * *